United States Patent
Feuersänger et al.

(10) Patent No.: US 8,533,148 B1
(45) Date of Patent: Sep. 10, 2013

(54) DOCUMENT RELEVANCY ANALYSIS WITHIN MACHINE LEARNING SYSTEMS INCLUDING DETERMINING CLOSEST COSINE DISTANCES OF TRAINING EXAMPLES

(71) Applicants: Christian Feuersänger, Rheinbach (DE); Dietrich Wettschereck, Bonn (DE); Jan Puzicha, Rheinbach (DE)

(72) Inventors: Christian Feuersänger, Rheinbach (DE); Dietrich Wettschereck, Bonn (DE); Jan Puzicha, Rheinbach (DE)

(73) Assignee: Recommind, Inc., San Francisco, CA (US)

( * ) Notice: Subject to any disclaimer, the term of this patent is extended or adjusted under 35 U.S.C. 154(b) by 0 days.

(21) Appl. No.: 13/632,943

(22) Filed: Oct. 1, 2012

(51) Int. Cl.
*G06F 15/00* (2006.01)
*G06F 15/18* (2006.01)

(52) U.S. Cl.
USPC .......................................................... 706/62

(58) Field of Classification Search
None
See application file for complete search history.

(56) References Cited

U.S. PATENT DOCUMENTS

| | | | |
|---|---|---|---|
| 6,473,753 B1* | 10/2002 | Katariya et al. | 1/1 |
| 2009/0164416 A1* | 6/2009 | Guha | 707/2 |
| 2009/0210406 A1* | 8/2009 | Freire et al. | 707/5 |
| 2010/0198837 A1* | 8/2010 | Wu et al. | 707/748 |
| 2011/0010363 A1* | 1/2011 | Homma et al. | 707/723 |

OTHER PUBLICATIONS

'Relevance feedback document retrieval using support vector machines': Onoda, 2005, Springer Verlag, AM 2003, LNAI 3430 pp. 59-73.*

* cited by examiner

*Primary Examiner* — Kakali Chaki
*Assistant Examiner* — Peter Coughlan
(74) *Attorney, Agent, or Firm* — Carr & Ferrell LLP (57) ABSTRACT

Systems and methods that quantify document relevance for a document relative to a training corpus and select a best match or best matches are provided herein. Methods may include generating an example-based explanation for relevancy of a document to a training corpus by executing a support vector machine classifier, the support vector machine classifier performing a centroid classification of a relevant document in a term frequency-inverse document frequency features space relative to training examples in a training corpus, and generating an example-based explanation by selecting a best match for the relevant document from the training examples based upon the centroid classification. Determining the training example having the closest cosine distance to the relevant document includes ranking the training examples by stretching the internal best match scores for the training examples linearly to cover a complete unit interval.

17 Claims, 10 Drawing Sheets

DOCUMENT RELEVANCY ANALYSIS WITHIN MACHINE LEARNING SYSTEMS INCLUDING DETERMINING CLOSEST COSINE DISTANCES OF TRAINING EXAMPLES

FIELD OF THE TECHNOLOGY

Embodiments of the disclosure relate to machine learning systems that quantify the relevancy of a document relative to a training corpus by providing simple, intuitive and valid explanations for why a document is relevant to a training corpus. Additionally, present technology may provide best-matches of training documents included in the training corpus relative to a document selected by a classifier as relevant (e.g., training documents that are semantically close to the selected document).

BACKGROUND OF THE DISCLOSURE

Machine learning systems may utilize highly complex analysis algorithms to generate statistically valid document recommendations relative to training documents of a training corpus. While these recommendations are statistically valid, end users may prefer example-based explanations when trying to understand why a certain document was recommended by the machine learning system.

Some machine learning systems attempt to avoid non-intuitive algorithms altogether when human-understandability of results is of particular importance. This approach may be acceptable in domains where classification accuracy is not of highest importance and, typically, where the number of dimensions that are used to describe the problem is low. Unfortunately, a low dimensional space rarely, if ever, occurs in document classification processes.

Another approach is to use feature reduction algorithms to either reduce the input space or the complexity of the solution. Further approaches may involve interactive visualization methods that put the burden of finding the most suitable explanation (e.g., most relevant match) on the user. Additionally, these interactive visualization methods often require significant computing resources in addition to excessive or undesirable end user effort.

The success of feature reduction algorithms is highly domain dependent. They are most suitable in domains where input dimensions differ in quality, meaning, and/or where dimensions are redundant. Irrelevant and redundant dimensions (e.g., words) are typically filtered out via stop word lists or combined by phrase detection algorithms in document classification domains so that a further reduction of dimensions often leads to a significant deterioration in classification accuracy.

End users are typically not interested in algorithmic explanations, whether those explanations are simple or complex. The end user desires to inspect specific training examples that are most likely the cause for the given classification of a new document.

SUMMARY OF THE DISCLOSURE

According to some embodiments, the present technology may be directed to methods for quantifying relevancy of a document to a training corpus by: (a) calculating an internal best match score for a relevant document relative to each training example in the training corpus by: (i) determining cosine distances between the relevant document and training examples in the training corpus relative to term frequency-inverse document frequency weights associated with the training examples; (b) determining the training example having a closest cosine distance to the relevant document; and (c) outputting the training example having the closest cosine distance to the relevant document. Determining the training example having the closest cosine distance to the relevant document may include ranking the training examples by stretching the internal best match scores for the training examples linearly to cover a complete unit interval.

According to other embodiments, the present technology may be directed to machine learning systems that quantify relevancy of a document to a training corpus. The machine learning systems may comprise: (a) at least one server comprising a processor configured to execute instructions that reside in memory, the instructions comprising: (i) a classifier module that: (1) calculates an internal best match score for a relevant document relative to each training example in the training corpus by determining cosine distances between the document and training examples in the training corpus relative to term frequency-inverse document frequency weights associated with the training examples; and (2) determines the training example having the closest cosine distance to the relevant document; and (ii) a user interface module that outputs the training example having the closest cosine distance to the relevant document. The classifier module may determine the training example having the closest cosine distance to the relevant document by ranking the training examples by stretching the internal best match scores for the training examples linearly to cover a complete unit interval.

According to additional embodiments, the present technology may be directed to methods for generating an example-based explanation for relevancy of a document to a training corpus. These methods may comprise: (a) executing a support vector machine classifier that (i) generates a classification model using the training corpus; and (ii) classifies subject documents using the classification model; (b) creating a centroid classification for a selected relevant document in a term frequency-inverse document frequency feature space; and (c) generating an example-based explanation by selecting a best match for the selected relevant document from the training examples from the training corpus.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF EXEMPLARY EMBODIMENTS

In the following description, for purposes of explanation, numerous specific details are set forth in order to provide a thorough understanding of the disclosure. It will be apparent, however, to one skilled in the art, that the disclosure may be practiced without these specific details. In other instances, structures and devices are shown at block diagram form only in order to avoid obscuring the disclosure.

Generally speaking, the present technology is directed to systems and methods that perform document relevancy analyses within the context of machine learning systems.

Systems and methods provided herein may be used to quantify the relevancy of documents are available for various fields. In some instances, the present technology may be utilized to explain suggestions (e.g., suggested/relevant documents) generated by various machine learning technologies, such as support vector machines ("SVM").

The present technology may be trained based on manually provided training data. The present technology may suggest further "suggested documents" (e.g., relevant documents) to an end user. When the end user selects one of the suggested documents, the present technology may then generate a ranked sub-list of the original training data examples. The top-most entries explain best why the single selected suggested document has been suggested.

The present technology may combine statistical learning algorithms (using a support vector machine), which is used to train a category or domain of training examples. Additionally, the present technology may utilize an established similarity measure for comparing relevant documents to the training examples.

Broadly speaking, the present technology may use the training results of a support vector machine ("SVM") to suggest documents (e.g., relevant documents) to the end user. As used herein, a "suggested" document indicates that the SMV has determined that the end user should include the document in a particular category or classification. To this end, the SVM may analyze documents for which the user decided that are relevant, for example, those documents that the end user has determined to belong to a specific category.

In some instances, the end user wishes to understand why the SVM selected such documents as "relevant" in order to learn more about the data. However, the end user may not want to see complicated graphics. Furthermore, the end user may not want complicated explanations or insight into the mathematical details of the learning procedure. The present technology provides the end user with an example-based explanation of the form "the document has been suggested because it matches the designated input documents very closely."

An example-based explanation may be a challenge for the SVMs to generate because the involved algorithms operate on the whole set of input documents at once, often using global optimization schemes. Afterwards, SVMs provide insight about relevant words inside of documents or artificial "documents" which contain these words (the "support vectors"). The end-user, however, may desire to determine the best match or a ranked list of matches for the designated input documents. For example, the end user desires to inspect examples, and particularly the most relevant examples, selected from the training examples used to train the SVMs.

In furtherance thereof, the present technology may determine the cosine distance between the relevant document and the training examples relative to a tf-idf weight vector space. Generally described, the tf-idf may comprise a weight (term frequency-inverse document frequency), which is a numerical statistic that reflects how important a word is to a document in a collection or training corpus. It is often used as a weighting factor in information retrieval and text mining. The tf-idf value increases proportionally to the number of times a word appears in the document, but is offset by the frequency of the word in the corpus training examples, which helps moderate the fact that some words are generally more common than others.

During calculation of cosine distances, the present technology may assign particular weights to the words of each document. In some instances the weights depend on the complete document corpus of training examples.

In operation, the end user picks one "relevant" document for which the end user seeks an explanation. The end user wants to know why the SVM deems this document as "relevant." The present technology then locates training examples which are semantically close to that selected and relevant document. In some instances the search may be restricted to the set of training examples that the user marked as "these belong to my category" and which have been used by the SVM in order to learn the category/domain. Document "closeness" may be defined by means of the tf-idf similarity measure. In fact, the search for "best matches" with respect to the selected "relevant" document among the set of training examples is conceptually equivalent to the training of a centroid classifier which is centered on the single selected "relevant" document.

The present technology provides a fast and simple way to trigger the aforementioned computations and to inspect the results. Furthermore, the present technology unifies results such that not only explanations for a single suggested document can be retrieved, but also results for any suggested documents for which the end user seeks explanations regarding why the SVM suggested the documents.

Figure 1:
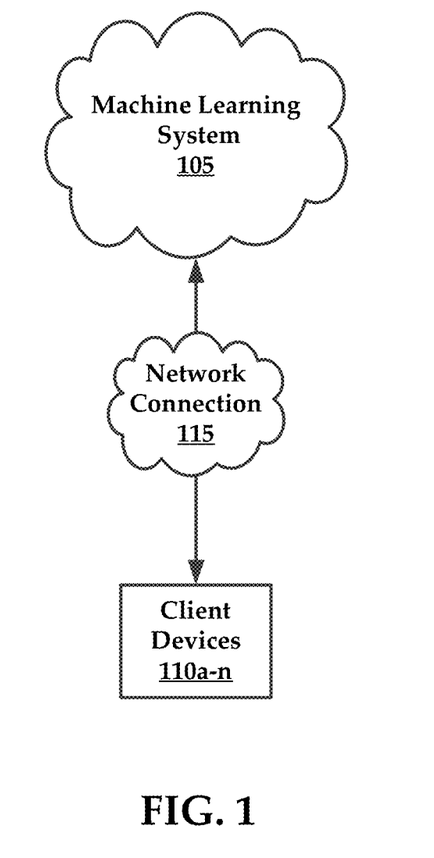
FIG. 1 illustrates an exemplary system for practicing aspects of the present technology.

FIG. 1 illustrates an exemplary system for practicing aspects of the present technology. The system may include a machine learning system 105 that may include one or more web servers, along with digital storage media device such as databases. The machine learning system 105 may also function as a cloud-based computing environment that is configured to process electronic documents in accordance with various embodiments of the present technology. Details regarding the operation of machine learning system 105 will be discussed in greater detail with regard to FIG. 2.

In general, a cloud-based computing environment is a resource that typically combines the computational power of a large grouping of processors and/or that combines the storage capacity of a large grouping of computer memories or storage devices. For example, systems that provide a cloud resource may be utilized exclusively by their owners, such as Google™ or Yahoo!™; or such systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depend on the type of business associated with the user.

A plurality of client devices $110a$-$n$ may communicatively couple with the machine learning system 105 via a network connection 115. The network connection 115 may include any one of a number of private and public communications mediums such as the Internet. The client devices $110a$-$n$ may be required to be authenticated with the machine learning system 105 via credentials such as a username/password combination, or any other authentication means that would be known to one of ordinary skill the art with the present disclosure before them.

Figure 2:
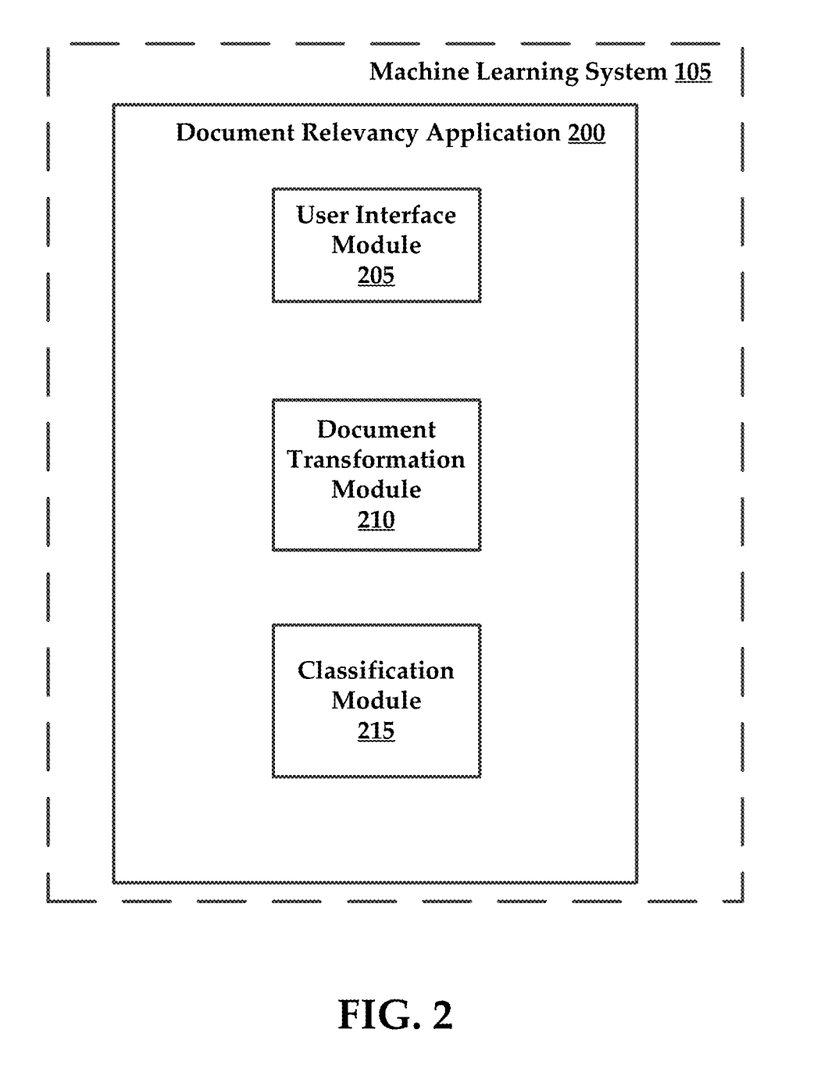
FIG. 2 shows a schematic diagram of an exemplary document relevancy application.

FIG. 2 illustrates a block diagram of an exemplary document relevancy application, hereinafter application 200, which is constructed in accordance with the present disclosure. The application 200 may reside within memory of the machine learning system 105. According to some embodiments, execution of the application 200 by a processor of the machine learning system 105 may cause the machine learning system 105 to quantify relevancy of a document to a training corpus by first calculating an internal best match score for a relevant document relative to each training example in the training corpus. The internal best match score may be calculated by determining cosine distances between the relevant document and training examples in the training corpus relative to term frequency-inverse document frequency weights associated with the training examples. Additionally, the machine learning system 105 may determine the training example having the closest cosine distance to the relevant document, as well as output the training example having the closest cosine distance to the relevant document. As mentioned above, the training example having the closest cosine distance to the relevant document may also be referred to as the "best match" for the relevant document.

The application 200 may comprise a plurality of modules such as a user interface module 205, a document transformation module 210, and a classification module 215. It is noteworthy that the application 200 may include additional modules, engines, or components, and still fall within the scope of the present technology. As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality. In other embodiments, individual modules of the application 200 may include or be executed on separately configured web servers.

The client nodes may interact with the application 200 via one or more graphical user interfaces that are generated by the user interface module 205. Additionally, example-based explanations of document relevancy may be provided to the client devices via one or more graphical user interfaces. Various graphical user interfaces generated by the user interface module are illustrated in FIGS. 3-7, which will be described in greater detail below.

Prior to providing example-based explanations of document relevancy, the document transformation module 210 may be executed to transform each relevant document and/or the training examples to a high-dimensional feature space using term (e.g., word) frequencies. The document transformation module 210 may employ the definition $$x^\omega = tf(x, j) \geq 0$$

that determines a relative number of occurrences of term j in document x. It will be understood that a "term" may comprise an original word as it occurred in an input document, a stemmed word, or a phrase. Stop words may be excluded by the document transformation module 210. A stemmed word may result from standard stemming procedures that would be known to one of ordinary skill in the art with the present disclosure before them. A phrase is a combination of two or more words, which may be computed by one or more statistical methods that would also be known to one of ordinary skill in the art.

Additionally, prior to providing example-based explanations of document relevancy, the classification module 215 may be trained on a training corpus that comprises training examples. These training examples may be selected by the end user. The classification module 215 may classify a set of documents and determine relevant documents in the set using a SVM model, such as a hyperplane.

More specifically, the classification module 215 may be executed to calculate internal best match scores for a relevant document d for each training example x in a training corpus. In some instances, the classification module 215 may comprise a linear SVM. It can be assumed that the classification module 215 has been trained on a non-empty training data set defined by $$T = \{x_1, \ldots, x_N\} \subset D \subset R^m$$

where D is the document universe containing all documents and m is the dimension of the feature space. A document d∈D\T has been suggested by the classification module 215 using an exemplary scoring mechanism. By way of non-limiting example, the classification module 215 may determine a distance for the document d relative to a SVM model hyperplane.

In order to establish a connection between the document d and one of the training examples x, the classification module 215 may define internal best match scores with respect to d for each training documents defined by $x_i$, i=1, ..., N, as follows: let $$\tilde{x}_i(\sqrt{x^{(j)}} \cdot \mathrm{idf}_j(D))_{j=L \ldots m}$$

be the tf-idf weight of $$x = (x^{(1)}, \ldots, x^{(m)}) \in D.$$

Additionally, the classification module 215 may utilize the following equation $$\mathrm{idf}_j(D) = \log \frac{|D|}{|\{x \in D \mid x_j \neq 0\}|}$$

to calculate the inverse document frequency for the training examples.

The classification module 215 may then apply a square-root transformation to term-frequencies to dampen the internal best match scores such that the internal best match scores rise linearly with the number of overlapping term counts, rather than quadratically, as for raw frequency counts.

Next, the classification module 215 may utilize $$B\_i := B(x\_i, d) := \frac{\tilde{x}_i \cdot \tilde{d}}{\|\tilde{x}_i\| \cdot \|\tilde{d}\|}$$

to calculate an internal best matches score for training document i with respect to the relevant document d. The scalar product divided by the vector lengths resembles the cosine distance between x_i and d in the tf-idf feature space.

According to some embodiments, the classification module 215 may then stretch the internal best matches scores linearly to cover the complete unit interval in order to provide a suitable ranking (e.g., explanation) of the relevant document for the end user. The classification module 215 may utilize $$b_i := b(x_i, d) := \frac{B_i - \min(B_j)}{\max(B_j) - \min(B_j)}$$

to calculate final best matches scores with respect to the relevant document d, wherein min and max are computed over j=1, . . . , N. Thus, the training document $b_i$ that equals 100% may be used as the best explanation for why the document d has been suggested by the classification module 215 as the closest training document. It is noteworthy that this approach is actually a training procedure for a centroid classifier trained from the single relevant document d where the centroid is d. The tf-idf scoring mechanism utilized by the classification module 215 allows a concise ranking of results.

Figure 3:
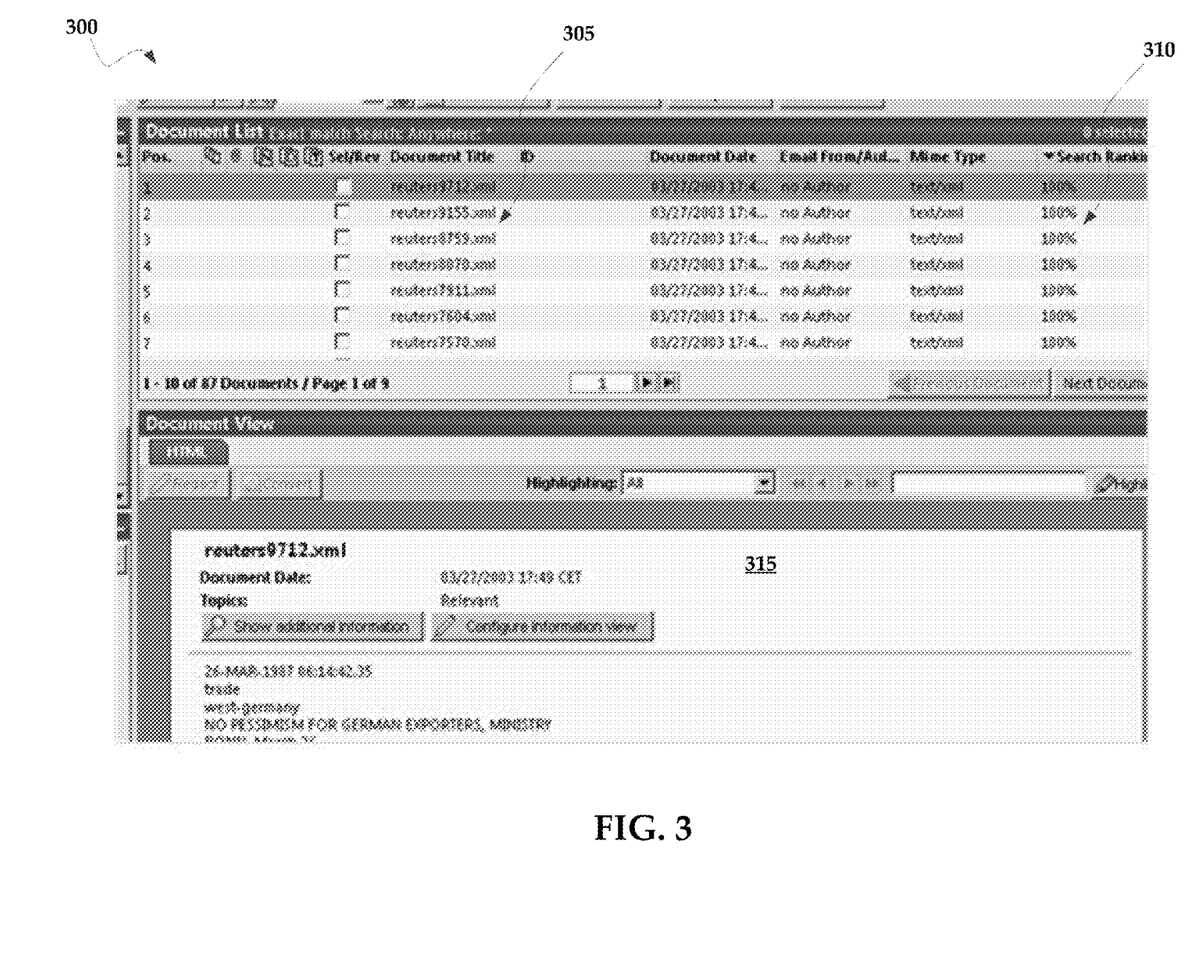
FIG. 3 is an exemplary graphical user interface that comprises a list of documents which have been marked as relevant by the user.

FIG. 3 is an exemplary graphical user interface 300 that comprises a list of manually categorized documents: the end user decided that they belong to the category "Relevant." The interface 300 displays the result of this decision. In this context, column 310 indicates a relevancy of 100% because all manually tagged documents have been requested. The subpane 315 comprises descriptive data regarding a selected item of list 305. As a next step, the user may start machine learning algorithms to let the computer suggest further relevant documents.

Figure 4:
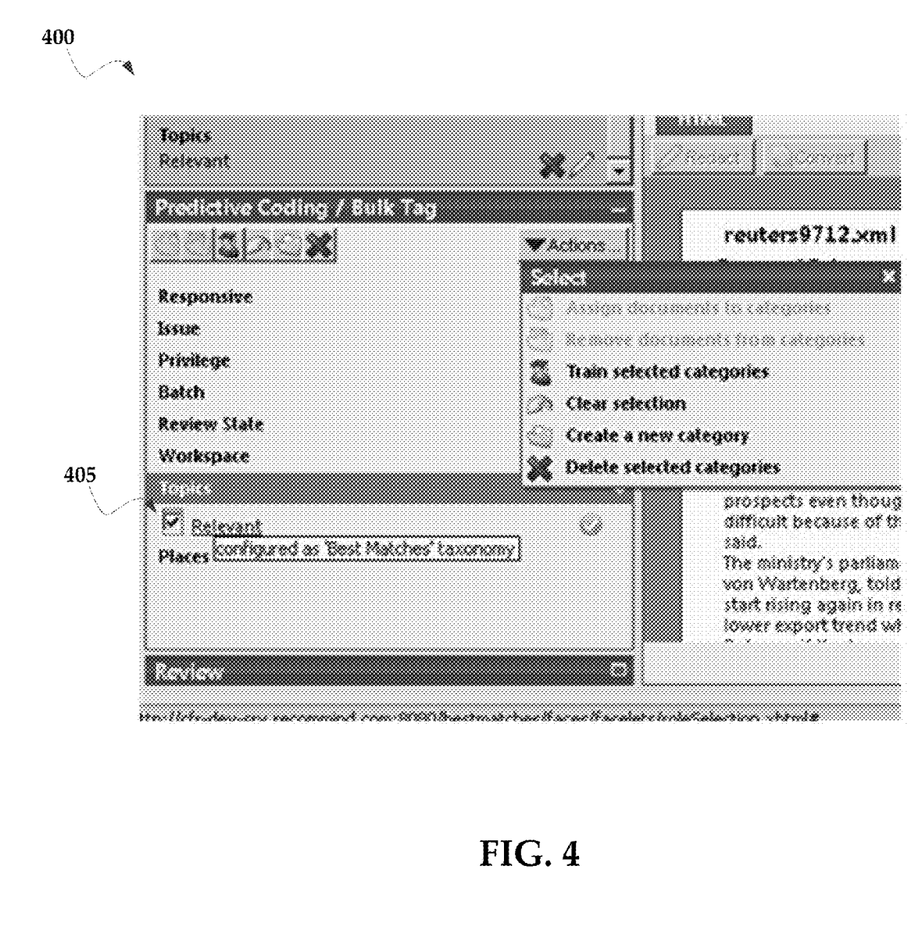
FIG. 4 is an exemplary graphical user interface that allows the end user to select how the classification module trains various aspects of the category/domain.

FIG. 4 illustrates an exemplary graphical user interface 400 that allows the end user to select how the classification module trains various aspects of the category/domain. The interface 400 allows the end user to define a set of documents in his category as "Relevant" by selecting the Relevant check box 405. In an exemplary use case it will be assumed that the classification module locates eighty seven documents which have been assigned by the classification module to the "Relevant" category.

Figure 5:
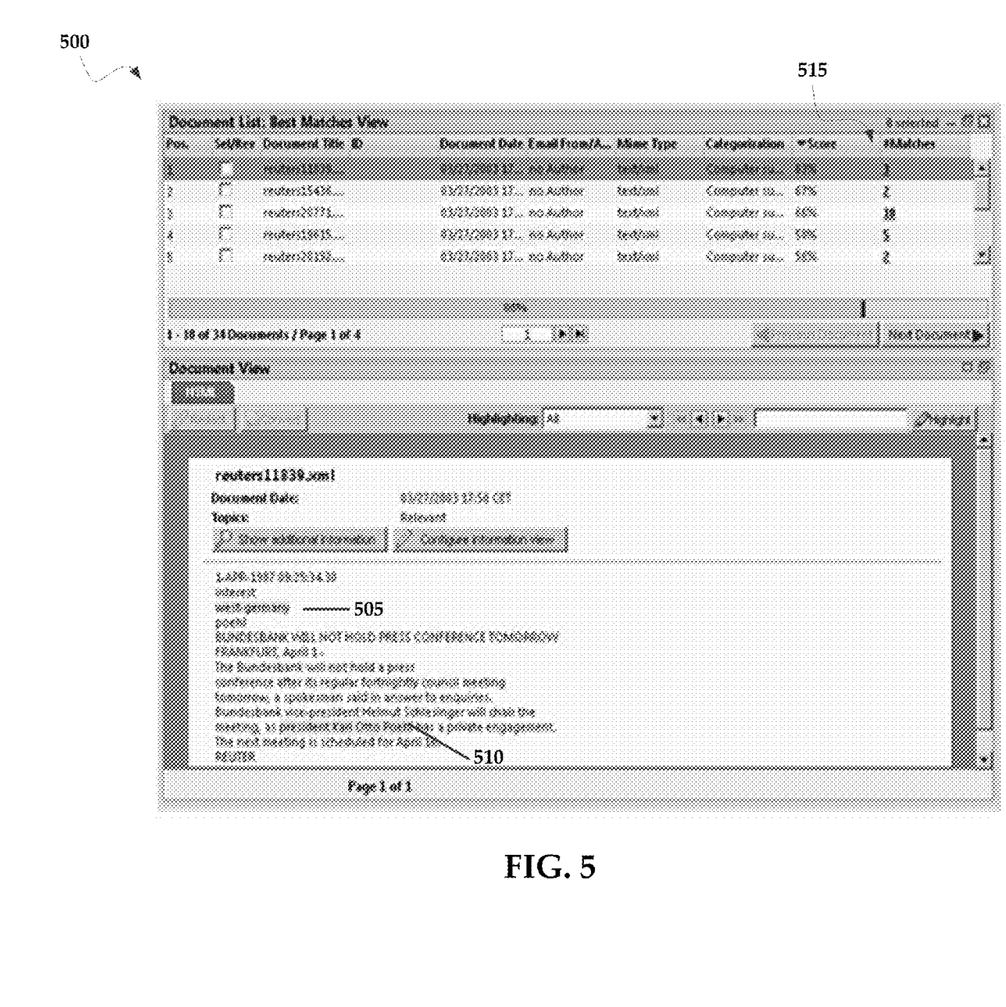
FIG. 5 is an exemplary graphical user interface that illustrates a Best Matches View.

FIG. 5 is an exemplary graphical user interface 500 that illustrates a Best Matches View. The "Relevant" category belongs to the "Topics" taxonomy. It has been configured as "Best matches" taxonomy, meaning that best matches will be computed. After the training of the classification module has finished, the end user sees all documents for which the classification module determines that the end user should consider being part of category "Relevant." The screen switches to color yellow to put emphasis on the fact that only computer suggested documents are displayed.

The end user typically wishes to inspect the training example which explains best why the relevant document has been suggested (e.g., he wants to see the best-match for a single selected document). If available, the end user may also locate further training documents which are almost as relevant. The end user may select a threshold relevancy value that allows the present technology to determine the number of documents that are close to the relevant document and provide a best-match explanation.

Threshold normalization simplifies the user experience when the end user retrieves best-matches for a different suggested document. For example, the end user may select 95% as relevancy threshold and always gets the best-match (which has 100%) and perhaps some which are close to the very best match. The threshold can be selected using the slider below the document list 500 (also referred to as interface 500 and graphical user interface 500): the value shown in FIG. 5 is 85% meaning that the number of best-matches with best-matches rank of at least 85% will be shown in column 515.

Note that the document display contains highlighted terms 505 and 510. These terms constitute the outcome of the support vector machine categorization. That is, the highlighted terms 505 and 510 provide one way to analyze what has been trained. For example, "west-germany" is among the important concepts of the "Relevant" category. The interface 500 comprises a column 515 entitled "#Matches". This column 515 shows the number of training documents for which the best-matches threshold is greater than 85%. This number has been selected by means of a slider mechanism, although other mechanisms for selecting a best-matches threshold may also be utilized. Clicking on the number "3" in column 515 "#Matches" opens the best-matches user interface shown in FIG. 6.

Figure 6:
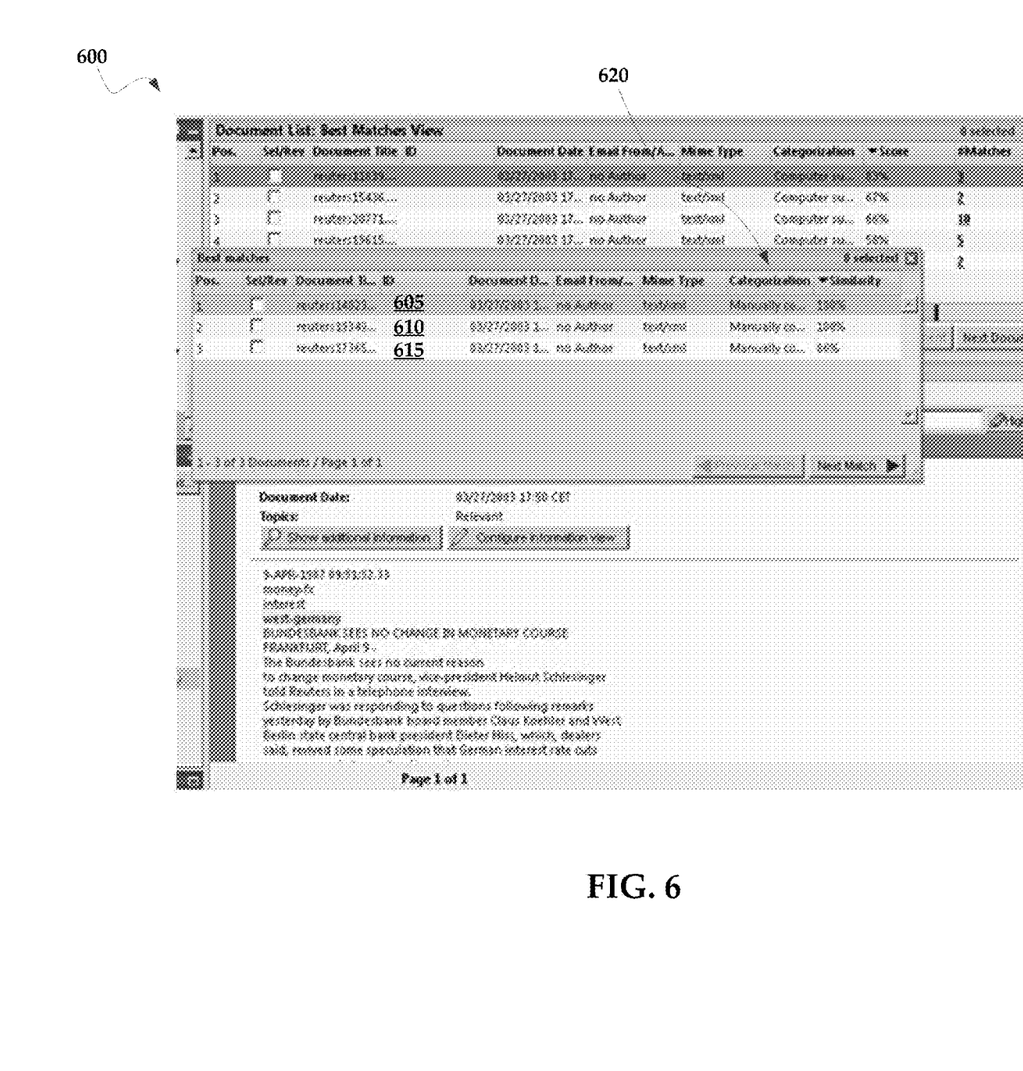
FIG. 6 is an exemplary graphical user interface for Best Matches that is overlaid upon the interface of FIG. 5.

FIG. 6 is an exemplary graphical user interface 600 for Best Matches that is overlaid upon the interface 500 of FIG. 5. Here, we see the three matches 605, 610, and 615, two of which are 100% relevant (e.g., 605 and 610). These are the two best matches as defined by the b_i numbers calculated by the classifier module as described above. The third entry has similarity of 86%. Each of these documents has a state of "Manually coded" 620. The manually coded indicator informs the end user that the document belongs to the original training data set. Only those original documents are considered here. The document display shows that the selected document 'reuters14829 . . . ' is associated with west-germany.

Figure 7:
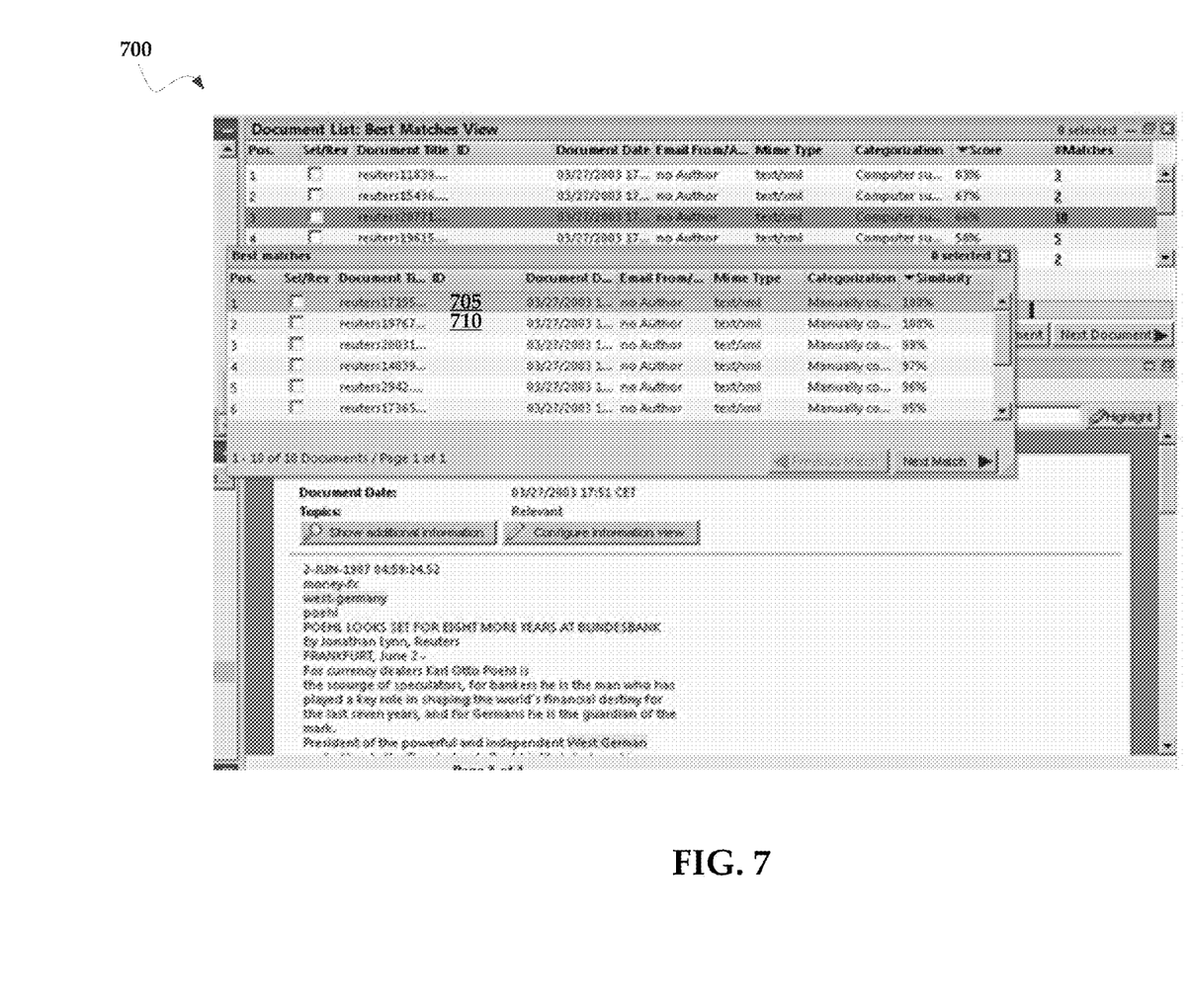
FIG. 7 is an exemplary graphical user interface having ten best-matches for the relevant document.

FIG. 7 is an exemplary graphical user interface 700 having ten best-matches for the document including a document with a "Pos." 3. The ten closest best-matches (e.g., closest cosine distances), two of which have best-matches similarity 100%, documents 705 and 710. The 100% refers to the best match with respect to the selected suggested document. The stretching means may be similar for every document, even though particular documents may have more than one document which has the same similarity.

Figure 8:
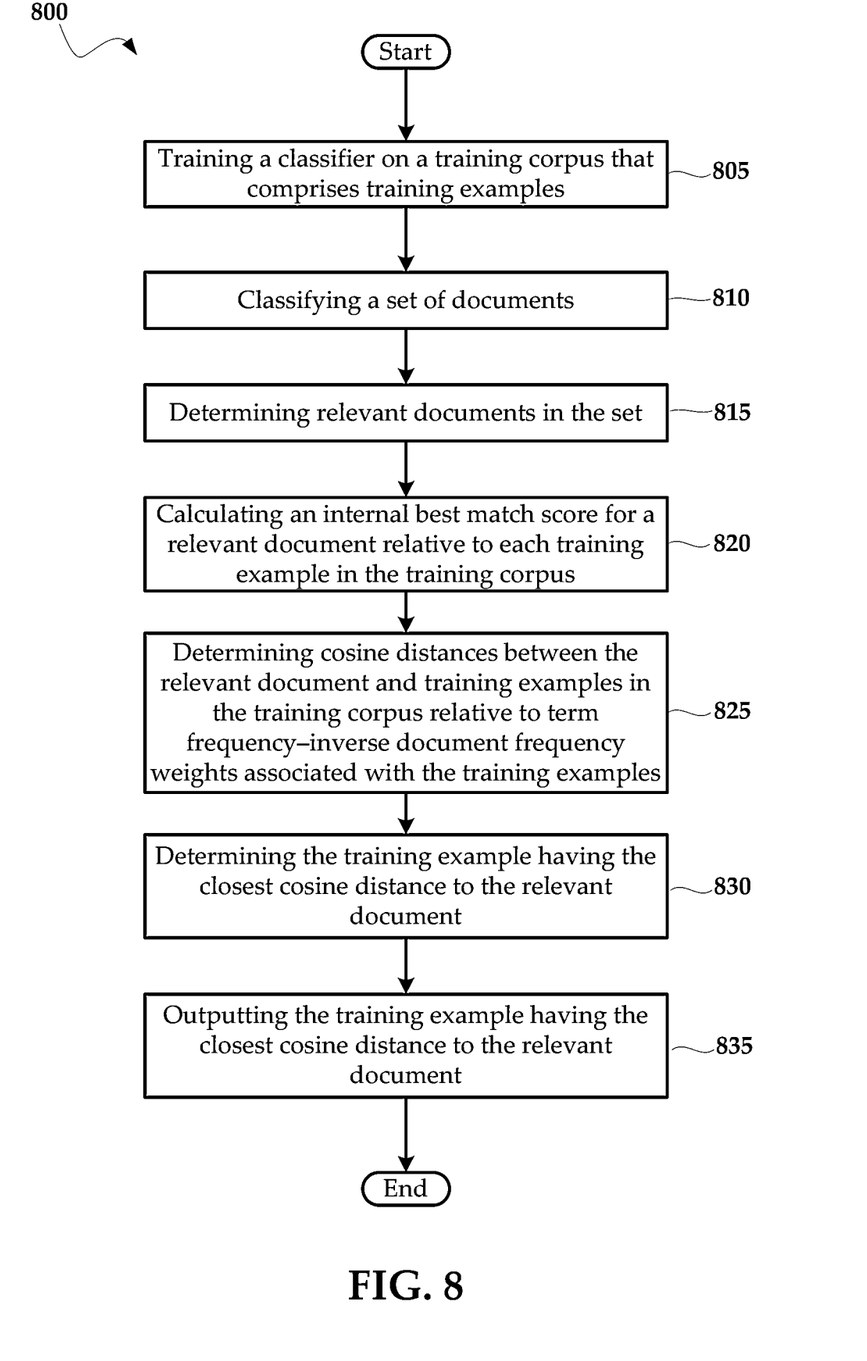
FIG. 8 is a flowchart of an exemplary method for quantifying relevancy of a document to a training corpus.

FIG. 8 is a flowchart of an exemplary method 800 for quantifying the relevancy of a document to a training corpus. The method 800 may comprise a step 805 of training a classifier on a training corpus that comprises training examples. Additionally, the method may comprise a step 810 of classifying a set of documents, as well as a step 815 of determining relevant documents in the set.

To provide any example-based explanation for why a relevant document is relevant to one or more training examples in the training corpus, the method may comprise a step 820 of calculating an internal best match score for a relevant document relative to each training example in the training corpus. Calculating an internal best match score may comprise a step 825 of determining cosine distances between the relevant document and training examples in the training corpus relative to term frequency-inverse document frequency weights associated with the training examples. Next, the method 800 may comprise a step 830 of determining the training example having the closest cosine distance to the relevant document, as well as a step 835 of outputting the training example having the closest cosine distance to the relevant document.

It is noteworthy that in some instances, steps 805-815 may be executed separately from steps 820-835. That is, the classification of documents may be performed prior to the calculation of best matches for a relevant document.

Figure 9:
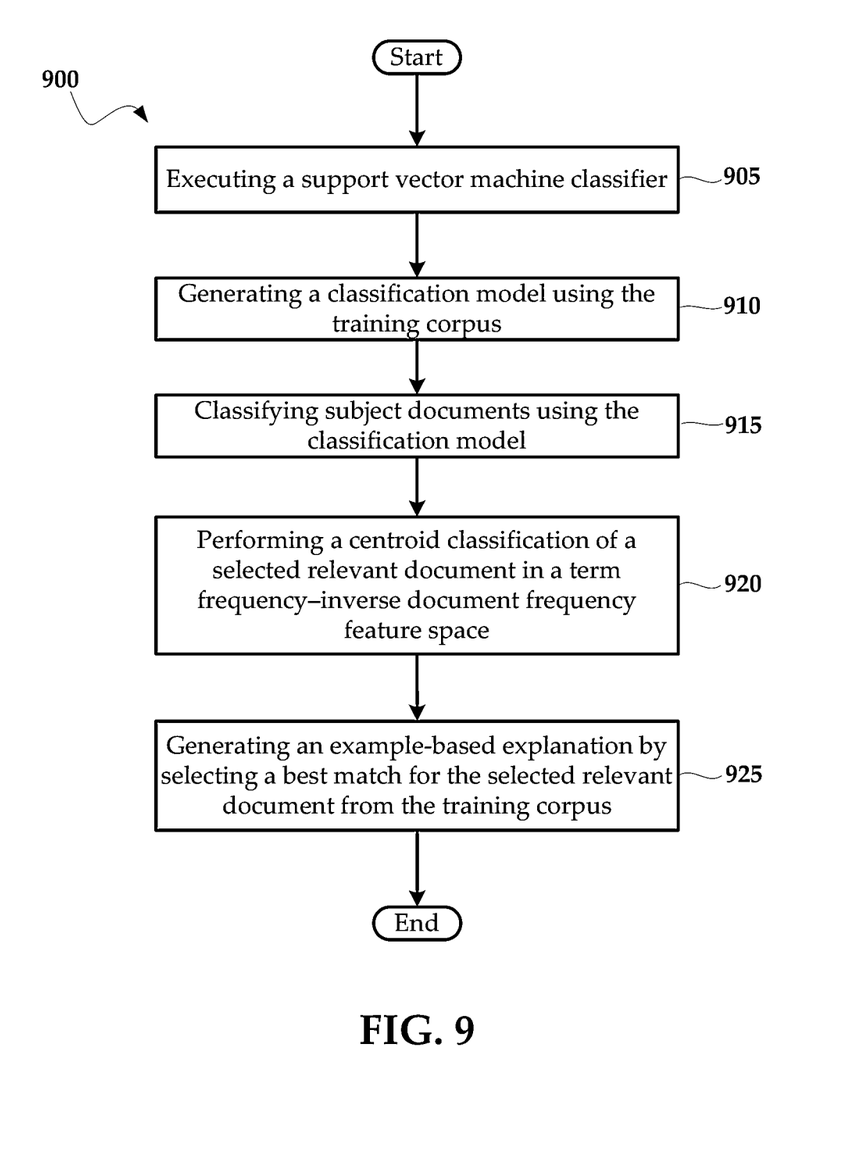
FIG. 9 is a flowchart of an exemplary method for generating an example-based explanation for relevancy of a document to a training corpus.

FIG. 9 is a flowchart of an exemplary method 900 of generating an example-based explanation for relevancy of a document to a training corpus. Generally, the method 900 may comprise a step 905 of executing a support vector machine classifier. Execution of the SVM may comprise various steps such as a step 910 of generating a classification model using the training corpus. Next, the method may comprise a step 915 of classifying subject documents using the classification model. After classification, the method may comprise a step 920 of performing a centroid classification of a selected relevant document in a term frequency-inverse document frequency feature space, as well as a step 925 of generating an example-based explanation by selecting a best match for the selected relevant document from the training corpus.

Next, the method may comprise a step 910 of generating an example-based explanation by selecting a best match for the relevant document from the training examples based upon the centroid classification.

Figure 10:
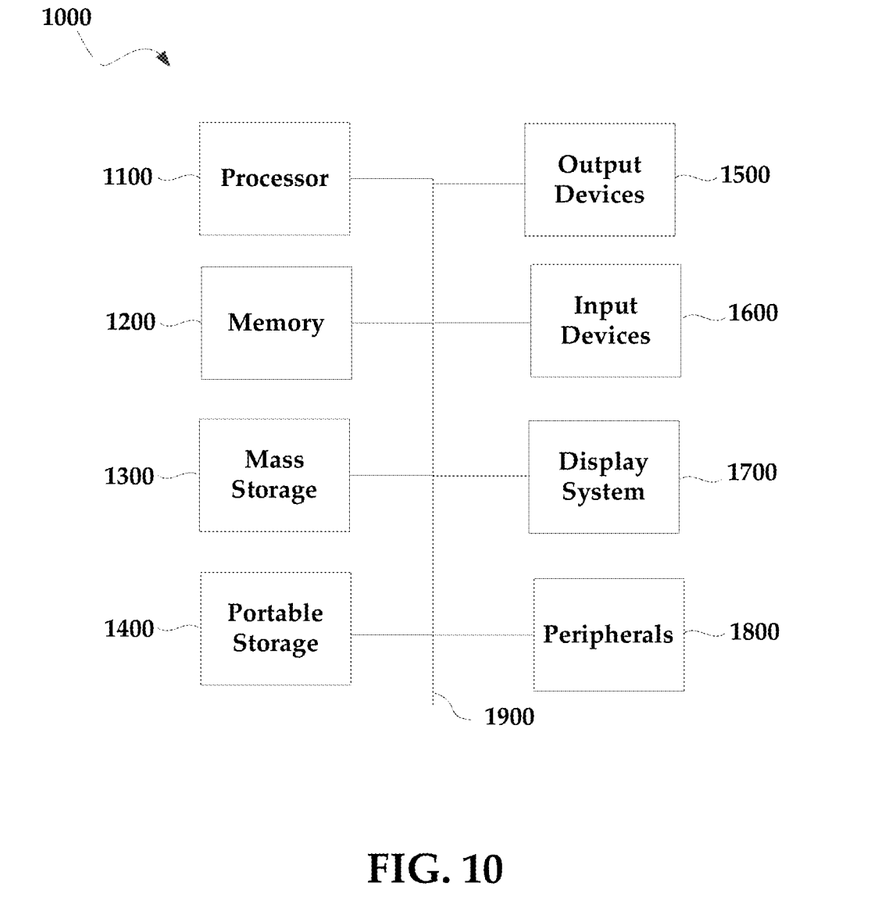
FIG. 10 illustrates an exemplary computing system that may be used to implement embodiments according to the present technology.

The computing system 1000 of FIG. 10 may be implemented in the contexts of the likes of computing systems, networks, servers, or combinations thereof. The computing system 1000 of FIG. 10 includes one or more processors 1100 (also referred to as processor unit 1100) and main memory 1200. Main memory 1200 stores, in part, instructions and data for execution by processor 1100. Main memory 1200 may store the executable code when in operation. The system 1000 of FIG. 10 further includes a mass storage device 1300, portable storage medium drive(s) 1400, output devices 1500, user input devices 1600, a graphics display 1700 (also referred to as display system 1700), and peripheral devices 1800.

The components shown in FIG. 10 are depicted as being connected via a single bus 1900. The components may be connected through one or more data transport means. Processor unit 1100 and main memory 1200 may be connected via a local microprocessor bus, and the mass storage device 1300, peripheral device(s) 1800, portable storage device 1400, and graphics display 1700 may be connected via one or more input/output (I/O) buses.

Mass storage device 1300, which may be implemented with a magnetic disk drive or an optical disk drive, is a non-volatile storage device for storing data and instructions for use by processor unit 1100. Mass storage device 1300 may store the system software for implementing embodiments of the present technology for purposes of loading that software into main memory 1200.

Portable storage device 1400 operates in conjunction with a portable non-volatile storage medium, such as a floppy disk, compact disk, digital video disc, or USB storage device, to input and output data and code to and from the computing system 1000 of FIG. 10. The system software for implementing embodiments of the present technology may be stored on such a portable medium and input to the computing system 1000 via the portable storage device 1400.

Input devices 1600 provide a portion of a user interface. Input devices 1600 may include an alphanumeric keypad, such as a keyboard, for inputting alpha-numeric and other information, or a pointing device, such as a mouse, a trackball, stylus, or cursor direction keys. Additionally, the system 1000 as shown in FIG. 10 includes output devices 1500. Suitable output devices include speakers, printers, network interfaces, and monitors.

Graphics display 1700 may include a liquid crystal display (LCD) or other suitable display device. Graphics display 1700 receives textual and graphical information, and processes the information for output to the display device.

Peripherals 1800 (also referred to as peripheral devices 1800) may include any type of computer support device to add additional functionality to the computing system. Peripheral device(s) 1800 may include a modem or a router.

The components provided in the computing system 1000 of FIG. 10 are those typically found in computing systems that may be suitable for use with embodiments of the present technology and are intended to represent a broad category of such computer components that are well known in the art. Thus, the computing system 1000 of FIG. 10 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Macintosh OS, Palm OS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for quantifying relevancy of a document to a training corpus, the method comprising:

calculating, by a processor, an internal best match score for a relevant document relative to each training example in the training corpus by:
  determining cosine distances between the relevant document and training examples in the training corpus relative to term frequency-inverse document frequency weights associated with the training examples;
  determining the training example having a closest cosine distance to the relevant document; and
  outputting the training example having the closest cosine distance to the relevant document;
  wherein determining the training example having the closest cosine distance to the relevant document further comprises ranking the training examples by stretching the internal best match scores for the training examples linearly to cover a complete unit interval.

2. The method according to claim 1, further comprising converting each of the training examples into a high-dimensional feature space using term frequencies.

3. The method according to claim 1, further comprising calculating an internal best match score for each of the training examples by multiplying a square root of term frequencies by an inverse document frequency.

4. The method according to claim 1, further comprising:
  training a classifier on a training corpus that comprises training examples;
  classifying a set of documents; and
  determining relevant documents in the set.

5. The method according to claim 4, wherein the classifier comprises a support vector machine.

6. The method according to claim 4, wherein determining relevant documents in the set comprises determining distances between each document within the set of documents relative to a support vector machine model.

7. The method according to claim 1, further comprising outputting a list of the training examples based upon ranked cosine distances between the relevant document and the training examples.

8. The method according to claim 7, further comprising applying a relevancy threshold to affect an amount of training examples that are included in the list.

9. A machine learning system that quantifies relevancy of a document to a training corpus, the system comprising:
  at least one server comprising a processor configured to execute instructions that reside in memory, the instructions comprising:
    a classifier module that:
      calculates an internal best match score for a relevant document relative to each training example in the training corpus by:
        determining cosine distances between the document and training examples in the training corpus relative to term frequency-inverse document frequency weights associated with the training examples; and
        determines the training example having a closest cosine distance to the relevant document; and
    a user interface module that outputs the training example having the closest cosine distance to the relevant document;
    wherein the classifier module determines the training example having the closest cosine distance to the relevant document by ranking the training examples by stretching the internal best match scores for the training examples linearly to cover a complete unit interval.

10. The machine learning system according to claim 9, wherein each of the training examples has been converted into a high-dimensional feature space using term frequencies.

11. The machine learning system according to claim 9, wherein the classifier module calculates the internal best match score for each of the training examples by multiplying a square root of term frequencies by an inverse document frequency.

12. The machine learning system according to claim 9, wherein the classifier module further:
  classifies a set of documents; and
  determines relevant documents in the set, the classifier module being trained on a training corpus that comprises training examples.

13. The machine learning system according to claim 12, wherein the classifier module comprises a support vector machine.

14. The machine learning system according to claim 12, wherein the classifier module determines relevant documents in the set by determining cosine distances between each document within the set of documents using a support vector machine model.

15. The machine learning system according to claim 9, wherein the user interface module further outputs a list of the training examples based upon ranked cosine distances between the relevant document and the training examples.

16. The machine learning system according to claim 15, wherein the classifier module further applies a relevancy threshold to affect an amount of training examples that are included in the list.

17. A method for generating an example-based explanation for relevancy of a document to a training corpus, the method comprising:
  executing, by a processor, a support vector machine classifier that:
    generates a classification model using the training corpus; and
    classifies subject documents using the classification model;
  performing a centroid classification of a selected relevant document in a term frequency-inverse document frequency feature space; and
  generating an example-based explanation by selecting a best match for the selected relevant document from the training corpus.

* * * * *